No. 729,109. PATENTED MAY 26, 1903.
J. T. WARNER.
BOILER FLUE CUTTER.
APPLICATION FILED MAR. 30, 1903.
NO MODEL.
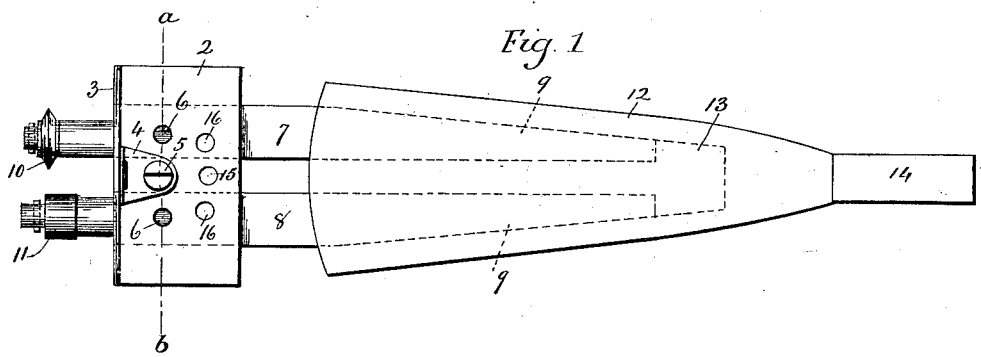
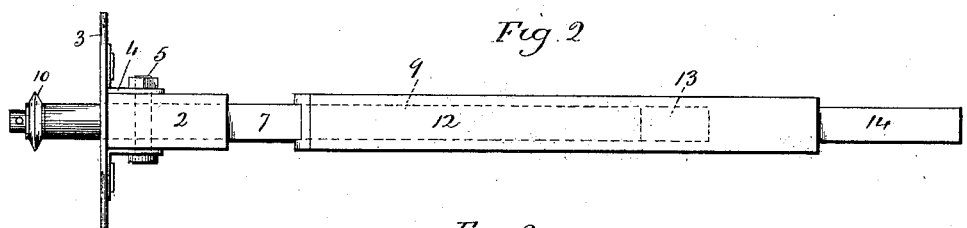
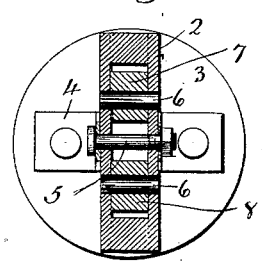
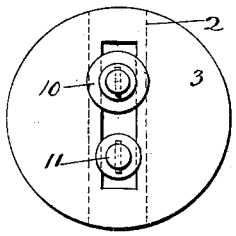
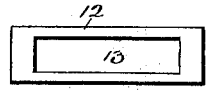
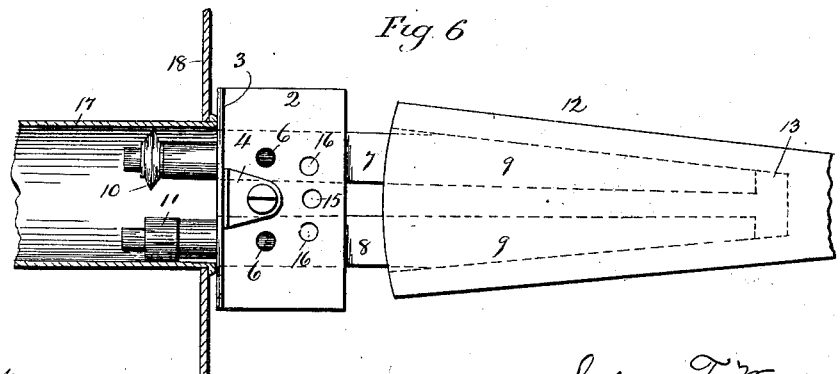
Witnesses
J. H. Shumny
Clara L. Weed.
Jason T. Warner.
Inventor.
By Atty Seymour Earle No. 729,109. Patented May 26, 1903.

UNITED STATES PATENT OFFICE.

JASON T. WARNER, OF NEW HAVEN, CONNECTICUT, ASSIGNOR OF ONE-HALF TO MICHAEL J. BURKE, OF NEW HAVEN, CONNECTICUT.

BOILER-FLUE CUTTER.

SPECIFICATION forming part of Letters Patent No. 729,109, dated May 26, 1903.

Application filed March 30, 1903. Serial No. 150,164. (No model.)

*To all whom it may concern:*

Be it known that I, JASON T. WARNER, of New Haven, in the county of New Haven and State of Connecticut, have invented a new and useful Improvement in Boiler-Flue Cutters; and I do hereby declare the following, when taken in connection with the accompanying drawings and the figures of reference marked thereon, to be a full, clear, and exact description of the same, and which said drawings constitute part of this specification, and represent, in—

Figure 1, a top or plan view of my device shown with one cutter; Fig. 2, a side view of the same; Fig. 3, a front view; Fig. 4, a sectional view on the line *a b* of Fig. 1; Fig. 5, a front end view of the socket; Fig 6, a plan view showing the device in its operating position.

This invention relates to an improvement in boiler-flue cutters—that is, a device by which injured boiler-flues may be cut inside the sheet, so that they may be removed for replacement—the object of the invention being a simple construction and arrangement which may be conveniently operated with a pneumatic or other motor; and the invention consists in the construction as hereinafter described, and particularly recited in the claims.

In carrying out my invention I employ a housing 2, which is rectangular in cross-section, and to one edge a disk 3 is attached so as to stand at a right angle thereto. This disk is preferably connected by means of corner-irons 4, which are secured to the disk and connected with the housing by a bolt 5, extending entirely through it. Mounted in the housing upon opposite sides of the center and upon pivots 6 are levers 7 8, both of which have long tails 9, the outer faces of which are inclined. These levers project through the disk 3, and one of them may be provided with a cutter 10 and the other with a roller 11, or both may be provided with cutters.

In connection with the device thus described I employ a socket 12, having a tapering recess 13, adapted to receive the tails 9 of the levers 7 8 and so that as the said tails enter the socket they will be forced together. This socket is provided with a rectangular shank 14 for connection with a pneumatic or other motor of usual construction and not shown. Preferably and as herein shown the housing is also provided with central holes 15 and with holes 16 on opposite sides thereof, the holes 15 16 being near the sides opposite to which the disk 3 is attached, the holes 16 being nearer the center than are the holes through which the pivots 6 extend. If a different-size tube is to be cut, the bolt 5 is removed, allowing the disk 3 to be separated from the housing, and the pivots 6 are also removed to disconnect the levers 7 8 therefrom. The housing is then reversed and the lever-pivots inserted through the holes 16 and the disk secured to the housing through the holes 15, this reversal of parts changing the throw of the cutters.

In operation the tails 9 of the levers are separated or the cutter and roller moved toward each other, permitting them to be readily inserted into a tube 17 until the disk 3 bears against the boiler-sheet 18, as shown in Fig. 6. The socket 12 is placed over the tails 9 and connected with the motor, whereby the socket is revolved, and as it revolves the cutters are turned accordingly. As the motor is moved toward the boiler-sheet it causes the socket to draw the tails of the levers together, thereby forcing the cutters outward and severing the tube inside the sheet.

It is apparent without further illustration or description that instead of employing one or two cutters two suitably-formed rollers may be applied to the ends of the levers, so as to expand a boiler-tube. I therefore do not wish to be understood as limiting the invention to a boiler-flue cutter.

Having fully described my invention, what I claim as new, and desire to secure by Letters Patent, is—

1. In a device of the class described, the combination with a housing, of a disk applied thereto, levers mounted in said housing and projecting outward therefrom, said levers formed with beveled tails, and a socket having beveled walls adapted to contract the levers as it is forced over the tails.

2. In a device of the class described, the combination with a housing, of a disk adapted to be attached to either side thereof, levers pivotally mounted in said housing and projecting outward therefrom and one of them carrying a cutter, said levers having inclined tails, and a socket having inclined recesses adapted to receive said tails and draw the same together as it is forced over them.

In testimony whereof I have signed this specification in the presence of two subscribing witnesses.

JASON T. WARNER.

Witnesses:
FREDERIC C. EARLE,
CLARA L. WEED.